United States Patent

[11] 3,604,265

| [72] | Inventors | Mason P. Wilson, Jr.<br>Kingston, R.I.;<br>Joseph B. Gordon, Northford; John B.<br>Duffy, Branford, Conn. |
|---|---|---|
| [21] | Appl. No. | 808,432 |
| [22] | Filed | Mar. 19, 1969 |
| [45] | Patented | Sept. 14, 1971 |
| [73] | Assignee | Neptune Meter Company<br>New York, N.Y. |

[54] FLUID-DRIVEN MASS FLOWMETER
12 Claims, 8 Drawing Figs.

| [52] | U.S. Cl. | 73/231 M |
|---|---|---|
| [51] | Int. Cl. | G01f 1/00 |
| [50] | Field of Search | 73/194, 231, 231 M, 194 M |

[56] References Cited
UNITED STATES PATENTS

| 2,714,310 | 8/1955 | Jennings | 73/194 |
|---|---|---|---|
| 3,144,769 | 8/1964 | Francisco | 73/231 |
| 3,232,110 | 2/1966 | Li | 73/231 |
| 3,241,367 | 3/1966 | Moss et al. | 73/231 |
| 3,344,666 | 10/1967 | Rilett | 73/231 |

*Primary Examiner*—Richard C. Queisser
*Assistant Examiner*—John P. Beauchamp
*Attorneys*—Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd ABSTRACT: A fluid-driven mass flowmeter comprising two identical impellers or rotors, having the same blade pitch design, arranged in tandem, back to back, and coupled by an intermediate linear torsion spring such that the upstream rotor is driven as a compressor by the downstream rotor which acts as a turbine. Energy input and flow turbulence are minimized and increased torque on the rotors is derived by the use of a compound blade shape and close rotor positioning so that the annular momentum which the upstream or compressor rotor puts into the passing stream, in the form of a swirl, is removed by the downstream or turbine rotor. The differing torques acting on the two rotors cause an angular displacement between them and an indication of the mass flow is obtained by measuring the time displacement of suitable markers on each rotor, which markers are axially aligned at zero angular displacement.

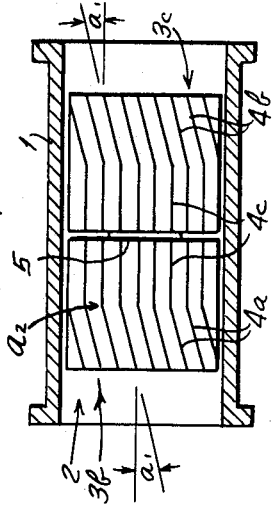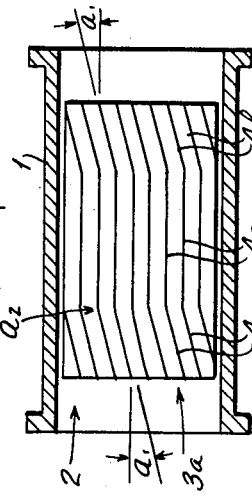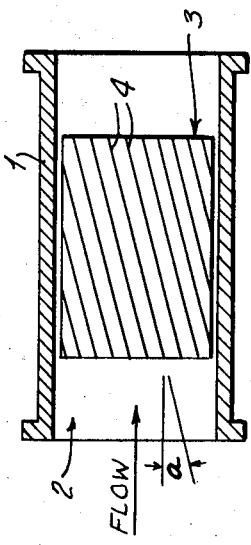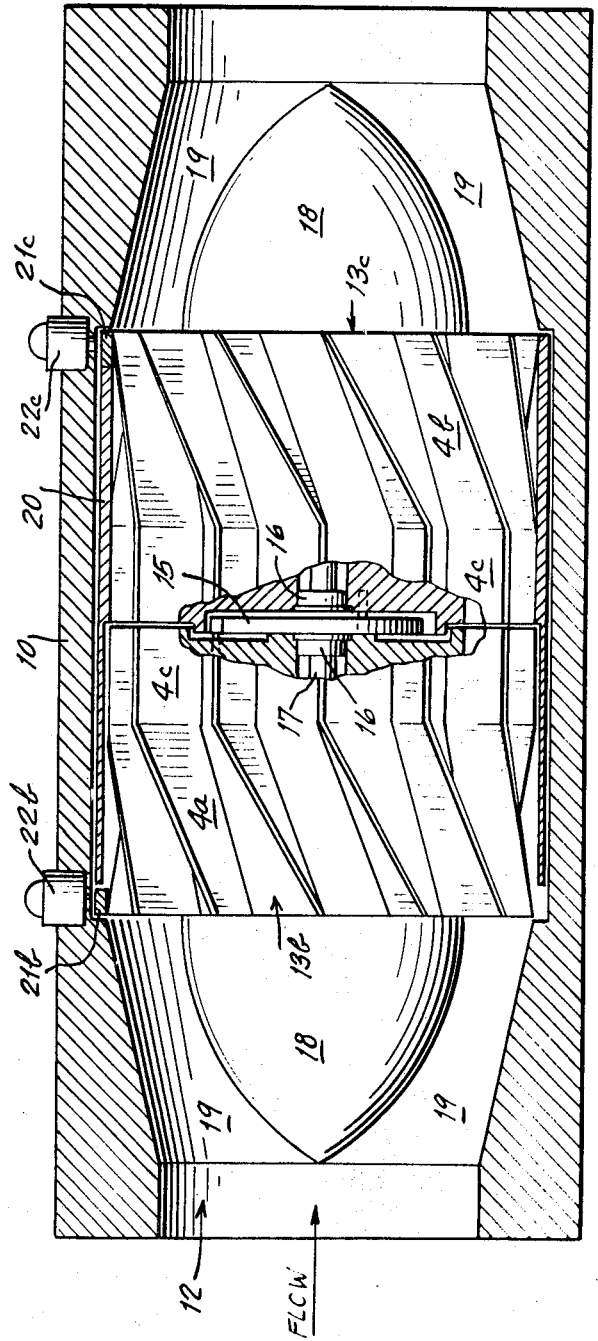

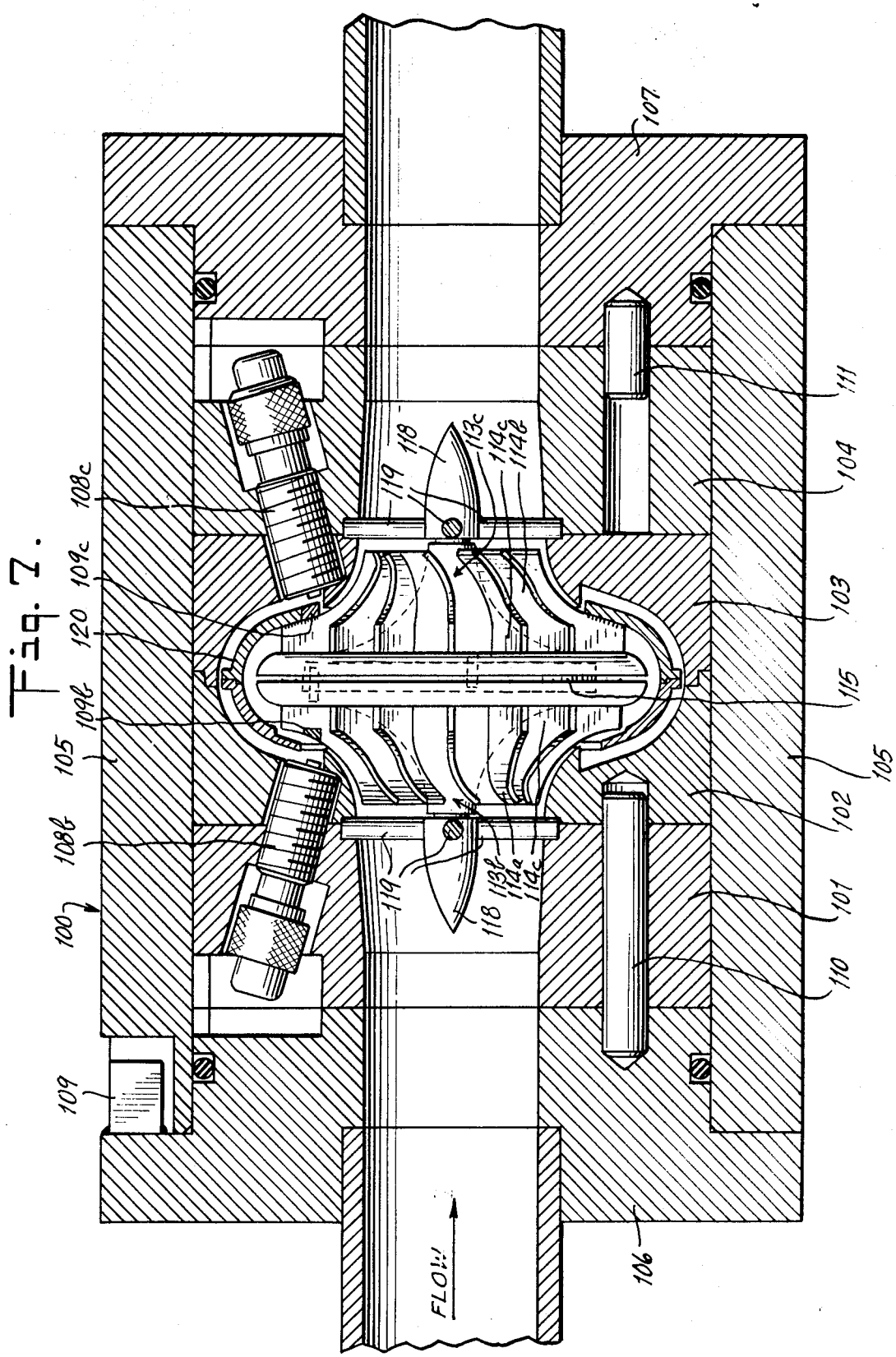

FLUID-DRIVEN MASS FLOWMETER

BACKGROUND OF THE INVENTION

The present invention relates to the flowmeter art and more particularly to a fluid driven mass flowmeter of the tandem-rotor type.

Fluid-driven mass flowmeters have been developed in the past utilizing tandem impellers or rotors that are connected together by a torsion spring. Such flowmeters generally operate on the principle of imparting an angular momentum to the passing fluid stream and detecting the reactive forces. The tandem rotors in reacting with the passing fluid stream are compelled to rotate in unison by the intermediate spring during steady flow but are angularly displaced relative to each other by the differing torques acting thereon. This displacement may be used to determine the mass flow in the fluid stream by measuring the time displacement of the two rotors with respect to a point on the path of rotation. Such a flowmeter is disclosed in U.S. Pat. No. 2,943,487 issued July 5, 1960, to David M. Potter.

More particularly, in the meter of the Potter patent, the tandem rotors have their blades set at different angles so that the rotors are geared differently to the fluid stream. The rotor blades appear to be of the simple helical type and are disposed at fixed inclinations to the rotor axes causing each rotor to tend to turn at a predetermined rotary speed for any given rate of fluid flow. As the blades of each rotor are of different average pitch, at a given rate of fluid flow, the rotors tend to turn at different speeds. The rotor with its blades disposed at the greater average angle to the flow stream axis will tend to turn faster. This faster rotor tends to lead the other and to act as a turbine while the slower rotor is dragged around with the turbine, by means of the intermediate torsion spring, and acts as a compressor. The compressor rotor experiences a reactive torque in imparting an angular momentum to the fluid stream resulting in differing torques on the two rotors. In a steady flow stream the two rotors are compelled by the connecting spring to turn in unison at a rate which is a compromise between the natural or uninhibited rates of each, but due to the different torques acting thereon, the rotors will be out of phase with one another. The out-of-phase condition or angular displacement of the two rotors increases with increase of the fluid velocity and with increase of the fluid density or, in other words, increase in fluid momentum. This follows since an increase in the momentum of the fluid stream produces an increased reactive torque or resistance to the efforts of the compressor rotor to impart an angular momentum to the stream. The angular displacement between the two rotors then is proportional to the mass flow rate.

Further, the time displacement between the two rotors gives a direct measure of mass flow rate and is detected by placing means on each rotor to produce one or more electrical impulses per revolution in an associated sensing device. The sensing device is connected to an electronic gate which is opened by the impulse from the leading rotor and closed by the impulse from the trailing rotor. While the gate is open, pulses from a constant frequency timing oscillator are caused to pass through the gate, thence through a calibration network which applies a proper calibration constant converting the constant frequency pulses per cycle, that is, per gate opening, to mass units per second, and then into a digital, rate indicating, display counter. This counter displays the count until the next pulse from the leading rotor resets the counter to zero and starts a fresh counting cycle.

While the prior art meters of the tandem rotor type have proven satisfactory in many applications, still the energy interchange between fluid and rotors causes losses resulting in decreased measuring torque and the introduction of variations in the flow stream during the testing operation. For example, the spacing of the Potter rotors fails to conserve angular momentum between them so that they withdraw energy from the flow stream producing a rotational velocity or swirl downstream of the test section which introduces inaccuracies into the reading obtained by the detector.

The flowmeter of the present invention utilizes a tandem rotor arrangement which minimizes the energy withdrawn from the fluid flow and the resulting downstream swirl, decreases the pressure drop across both rotors, and produces a higher torque between the rotors giving a greater spring deflection and improved accuracy.

SUMMARY OF THE INVENTION

The present invention embodies the use of two similar or identical rotors, having the same blade pitch design, which are mounted coaxially in tandem in a back to back orientation such that the downstream rotor acts as a turbine and the upstream rotor acts as a compressor. The compressor rotor in this arrangement imparts an angular momentum or rotational energy to the fluid stream, which energy is immediately transferred to and withdrawn by the turbine rotor so that the downstream flow is substantially devoid of any swirl. With the exception of the initial energy that deflects the torsion spring, the only energy which is withdrawn from the stream is that required to overcome frictional and drag effects. The pressure drop across both rotors is reduced to a minimum. As a result of this improved energy exchange, a higher torque is produced between the two rotors causing greater spring deflection and thus permitting greater accuracy in determining the mass flow from the rotor displacement.

In addition, a compound blade is used for greater torque conversion and the symmetry of the required parts facilitates manufacture and maintenance with an attendant increase in reliability and decrease in expense.

BRIEF DESCRIPTION OF THE DRAWINGS

FIG. 1 is a diagrammatic view of a conventional turbine-type flowmeter for recording volumetric flow rate;

FIG. 2 is a diagrammatic view of a meter of the type shown in FIG. 1, but with its rotor including a straight radial bladed portion between the helical-bladed ends;

FIG. 3 is a diagrammatic view of a meter of the type shown in FIG. 2 with the rotor separated into two parts;

FIG. 4 is a detailed sectional view of a mass flowmeter incorporating the present invention;

FIG. 7 is a detailed sectional view of a modification of the mass flowmeter of the present invention using rotors of the type shown in FIG. 6.

DETAILED DESCRIPTION

Figure 5:
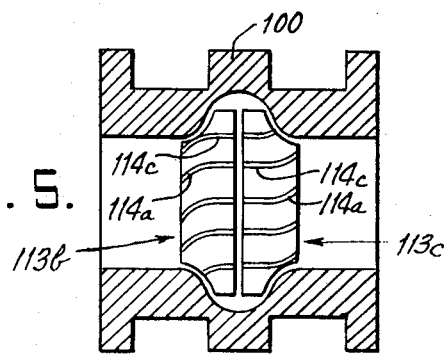
FIG. 5 is a diagrammatic view of a modification of the meter shown in FIG. 3.

Mass flowmeters, as previously noted, generally operate on the principle of imparting a known angular momentum to the fluid stream and detecting the resulting reactive forces which are a function of the mass flow rate. The meter of the present invention operates in accordance with this principle, but its particular theory of operation is perhaps best understood by considering the following analysis based on the operation of the conventional volumetric flowmeter.

FIG. 1 shows a conventional turbine-type flowmeter for recording volumetric flow. Such a flowmeter comprises basically a housing 1 defining the flow passage 2 and a helical bladed rotor 3 located in the passage 2 in the path of the flow. The speed of rotation of the rotor 3, which is driven by the fluid flow, is directly proportional to the volumetric flow rate and is a function of the helix angle, a, of the rotor blades 4 in accordance with the following relationship:

$$S = (V \tan a)/(2\pi R) \qquad (1)$$

wherein $S$ = the angular velocity of the rotor, $V$ is the velocity of the fluid, and $R$ is the mean blade radius.

If the rotor 3 is modified to include a straight radial bladed portion 4c in its central section as shown in FIG. 2, the modified rotor 3a then comprises blades which are helical on each end 4a and 4b with a radial portion 4c at the center. The angular velocity S of the rotor 3a will remain proportional to the volumetric flow since the speed of the given rotor is governed only by the external forces acting thereon. Internal forces, caused by tangential accelerating and decelerating of the fluid in the intermediate portion 4c, do not affect the overall performance of the rotor 3a. The accelerating and decelerating of the fluid, however, does create an internal torque completely within the rotor system. The internal torque will be $$T = k_1 R D V^2 (\tan a_1 - \tan a_2) \quad (2)$$

where $D$ is the density of the fluid, $a_1$ is the blade angle of portion 4a, $a_2$ is the blade angle of portion 4c, and $k_1$ is a constant of proportionality.

If the rotor 3a is now separated into two parts, 3b and 3c, as shown in FIG. 3, the internal torque will cause differential rotation between the two rotor parts 3b and 3c. If these two parts are connected by an intermediate torsion spring 5, the angular velocity of the rotor system will still be governed by the same proportional relationships, the only difference being that the two rotor parts, 3b and 3c, will be angularly displaced with respect to each other resulting from the opposed torsional moments caused by the internal tangential accelerating and decelerating of the fluid. The resulting device is a two-rotor system whose angular velocity is a function of the helix angle, $a_1$, of the blade portions, 4a and 4b, as defined in equation (1), and whose relative angular displacement is a function of the angular momentum imparted to the fluid which is equal to the internal torque $T$ as defined in equation (2).

The relative angular displacement $P$ of the two rotors, 3b and 3c, will impart a torque to the intermediate spring 5 which will be equal to the internal torque $T$. The torque $T$ is also directly proportional to the angular displacement $P$ when a linear torsion spring is connected between the rotors. This relationship may be expressed as:

$$T = k_2 P \text{ or } P = T/k_2 \quad (3)$$

Under steady flow conditions the two rotors, 3b and 3c, will be compelled to rotate together at a fixed rotational speed and angularly displaced in accordance with the mass flow rate. The angular displacement $P$ between the rotors can be determined by measuring the time displacement $t$ between given blades or suitable markers on each of the rotors, which blades or markers are axially aligned at zero angular displacement. The time displacement $t$ is directly proportional to the angular displacement $P$ between the two markers and inversely proportional to the velocity of the rotor system $S$ and accordingly may be expressed as follows:

$$t = k_3 P/s \quad (4)$$

A comparison of the above equations provides the relationship:

$$t = k_4 D V \quad (5)$$

The product $k_4 D V$ is directly proportional to the true mass flow rate that may be expressed as $ADV$ which is the continuity equation for one dimensional flow of an incompressible fluid where A represents the cross-sectional area of the flow channel. Thus, the time displacement $t$ is directly proportional to mass flow rate.

As indicated by equation (2) a particular operating torque may be achieved, within design limitations, by varying the internal angles of the blades of the rotor assembly. The internal angle $a_2$ may then be varied to match the operating torque to the spring characteristics. However, when the internal portion of the rotor blades are coplanar with the axis of rotation, that is, when $a_2 = 0°$, they have the advantage of producing fluid tangential velocities which are the same as the rotor tangential velocity. This condition produces better fluid control and tends to eliminate secondary flows, thus achieving optimum energy transfer. It is desirable therefore to maintain the internal blade portions 4c in the radial orientation. Under this condition, the desired operating torque may be achieved by changing the radius $R$ of the internal blade portions 4c since, as indicated by equation (2), for a given fluid velocity $V$, the torque $T$ is directly proportional to the radius $R$.

The external angles of the helical portions of the blades, 4a and 4b, that is, the inlet angle $a_1$ of rotor 3b and the exit angle $a_1$ of rotor 3c determine the rotational speed of the rotor system. Then by varying the angle $a_1$, the desired range of operating speeds may be achieved.

It has thus been found that an improved fluid driven mass flowmeter may be constructed using two rotors with compound blades and that the two rotors may be of identical design. The interchangeable rotors are mounted in tandem back to back and provide all the desired operating parameters.

A preferred embodiment of a meter of this type is shown in detail in FIG. 4. This meter comprises a housing 10 which defines the flow channel 12 and contains two axial flow-type rotors, 13b and 13c, connected together by an intermediate torsion spring 15. The rotors, 13b and 13c, are mounted for rotation by means of suitable bearings 16 on a fixed shaft 17 which is supported at its opposite ends by the bullets 18. The bullets 18 are mounted in the channel 12 by suitable support arms 19. The bullets 18 are their support arms 19 are all suitably faired so as not to interfere with the fluid flow.

The downstream rotor 13c is fitted about its periphery with an annular member or shroud 20 which surrounds the upstream rotor 13b and whose function will be more fully described hereinafter. Suitable markers, such as pole pieces 21b and 21c are provided on the upstream rotor 13b and the downstream end of the shroud 20 and axially aligned sensors 22b and 22c are mounted in the channel wall opposite each marker. The markers 21b and 21c rotate with the respective rotors 13b and 13c and produce electrical pulses or other indications during each revolution in the respective sensors 22b and 22c.

In operation, the fluid stream entering the upstream rotor 13b is tangentially accelerated by the compound blade portions, 4a and 4c, and upon leaving the rotor 13b strikes and produces a torque on the downstream rotor 13c. The downstream rotor 13c is decelerating the fluid flow, by the compound blade portions 4c and 4b, is driven by the flow and acts as a turbine. The intermediate torsion spring 15 transfers the driving force from the downstream turbine rotor 13c to the upstream rotor 13b which is thereby driven in the manner of a compressor. Thus, the upstream compressor rotor 13b imparts an angular momentum to the fluid stream which is removed by the downstream turbine rotor 13c. The energy exchange between the two rotors, 13b and 13c, initially causes a deflection of the intermediate torsion spring 15 and an angular displacement between the two rotors. In the steady flow condition, the rotors rotate in unison at a given angular displacement. Thus, the only energy withdrawn from the fluid flow is that stored in the deflected spring and the energy required to overcome drag and frictional losses in the rotor system. The flow downstream of the rotor system is almost free of turbulence and the pressure drop is minimized.

The predominant drag losses occur between the moving compressor rotor 13b and the stationary inner wall of the housing 10. These losses are minimized by enveloping the compressor rotor 13b with the shroud 20 which is attached to the downstream rotor 13c and therefore rotates in unison with the compressor rotor 13b in the steady flow condition.

The angular displacement between the two rotors 13b and 13c is sensed in terms of the time displacement between the rotating markers 21b and 21c, which time, as previously shown, is directly proportional to the mass flow rate. The two detectors 22b and 22c which are axially aligned, receive appropriate impulses from the markers 21b and 21c on the respective rotors 13b and 13c during each revolution. These impulses are fed to appropriate readout equipment, which will be subsequently described, and provide an indication of the mass flow rate.

Figure 6:
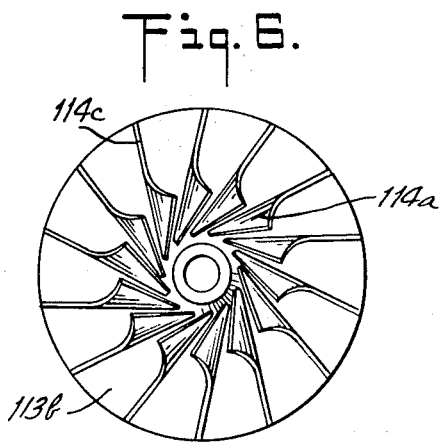
FIG. 6 is a front view of a rotor suitable for use in the meter of FIG. 5.

While axial rotor flowmeters of the type shown in FIG. 4 give suitable results at high flow rates, their accuracy is decreased in flow measuring applications with relatively low flow rates such as when used, for example, in aircraft fuel system measurement. For low flow rate applications, improved sensitivity can be achieved by modifying the meter of the present invention to comprise rotors of a combined axial-radial flow type rather than of the pure axial flow type. Such a modified flowmeter is shown diagrammatically in FIG. 5 and a suitable axial-radial flow-type rotor for use therein is shown in FIG. 6.

As previously noted, for a given flow rate, as the radius of the rotor is increased, the rotational velocity of the rotor decreases with an attendant increase in the torque thereon, so that a greater torque may be derived from a flow of given energy by increasing the flow radius such as with a rotor of the radial flow type. This increased radius is achieved in the compound bladed rotor of the present invention by increasing the radius of the radial portion of the blades and producing radial flow. The resulting rotor is of the type such as shown in FIG. 6 having a helical blade portion 114a and an enlarged radial portion 114b.

A preferred flowmeter embodying axial-radial flow-type rotors is shown in detail in FIG. 7 and comprises a housing 100 constructed of four flow-channel-forming sections, 101, 102, 103 and 104, held in place by a surrounding tube 105 and two end members 106 and 107. Two electromagnetic sensors, 108b and 108c, are mounted in the channel-forming sections and the angular positions of the sections may be adjusted to achieve axial alignment of the two sensor members 108b and 108c by the use of a set screw 109 and suitable dowel pins 110 and 111.

The blades of the rotors 113b and 113c in this meter are of the axial-radial flow-type so that the flow after passing the helical blade portion 114a is diverted radially outward in the compressor rotor 113b by the blade portion 114c and then radially inward when entering the turbine rotor 113c. A linear torsion spring 115 is provided between the tow rotors and a toroidal shroud 120 is attached to the edge of the turbine rotor 113c and envelopes the compressor rotor 113b. As in the axial model shown in FIG. 4, the rotors are mounted for rotation on a fixed shaft 117 supported by the faired bullets 118 and support arms 119. Pole pieces 109b and 109c are respectively mounted on the rotors 113b and 113c to provide the time displacement signals to the sensors 108b and 108c.

The operation of this meter is similar to that previously described in connection with the axial flowmeter with the exception that meters having rotors with a radial blade portion are more suitable for use with low flow rates by virtue of the increased torque obtainable.

It has been found also that the dimensions of the blades are important to efficient operation of such meters. For example, the blades must be sufficiently long to completely control the fluid flow so that a higher efficiency is achieved with blades of increased length. The number of blades on the rotor also affects the rotor performance and it has been found that increasing the number of rotor blades improves the control of the fluid in the internal portion of the flow and therefore the performance.

Figure 8:
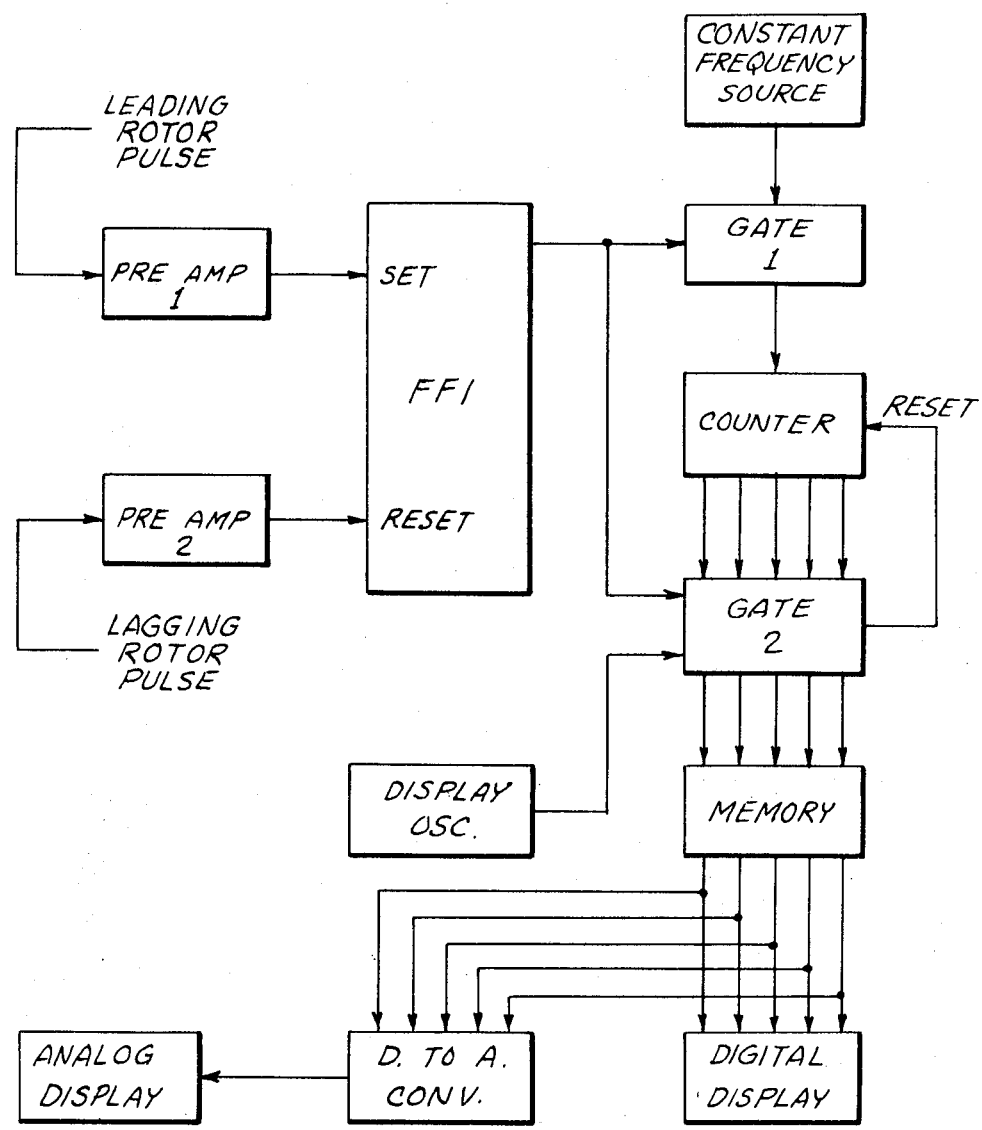
FIG. 8 is a block diagram of instrumentation to be used in connection with mass flowmeters of the present invention.

A suitable system for detecting and processing the time displacement signal is shown in FIG. 8. Standard electromagnetic pickups such as shown in FIG. 7 may be used to sense the passing of the pole pieces on the rotors by changing the magnetic field in the proximity of the pole piece. The resulting pulse from the leading rotor is fed through a preamplifier Preamp 1 and sets a bistable multivibrator or flip-flop circuit FF1. The setting of the flip-flop circuit FF1 opens a gate circuit, Gate 1, permitting a constant frequency to be fed from a constant frequency source to a counter. The subsequent pulse from the lagging rotor is passed through another preamplifier Preamp 2 and resets FF1 The resetting of FF1 closes Gate 1 and the counting is stopped. The pulses which have been fed in the interim to the counter are proportional to the time between the arrival of the leading rotor pulse and the arrival of the lagging rotor pulse. This time displacement is proportional to the mass flow rate and by proper selection of the constant frequency source the number of counts in the counter can be made to directly indicate the mass flow rate, that is, 1,247 counts can represent 12,470 pounds per hour.

The output of the counter is fed to a second gate circuit, Gate 2. A display oscillator is connected to Gate 2 and after flip-flop circuit FF1 is reset and the display oscillator has completed a cycle indicating that a new display is to be presented, Gate 2, opens and the number of counts in the counter are placed in a memory. Any information in the memory from previous cycles of operations is eliminated and the counter is reset by this transfer. The number of counts in the memory is immediately transferred to a digital display and to a digital to analog converter which feeds an analog display. Thus, the mass flow rate is displayed simultaneously on a digital and an analog display. Although both types of displays may be used, this instrumentation is essentially digital in nature so that a good degree of reliability is achieved by using established dependable digital circuits.

It will be seen that an improved fluid driven mass flowmeter is presented which is simple in construction utilizing two rotors having compound blades, which may be identical, and connected by an intermediate torsion spring, which meter provides increased accuracy by improved torque derivation while minimizing the turbulence and secondary flows in the flow stream and reducing the pressure drop to a minimum. The simplified construction contributes to ease of manufacture and maintenance, increased reliability and overall decrease in expense.

What is claimed is:

1. A fluid-driven mass flowmeter of the type comprising:
    a. a first rotor disposed in and driven by the fluid stream to be measured;
    b. a second rotor arranged coaxially with said first rotor in the fluid stream;
    c. torsional means connecting said first and second rotors and transmitting a driving torque from the first to the second rotor;

wherein the improvement comprises:
    d. said first rotor comprises blades having a helical portion at one end and a radial portion at the other end; and
    e. said second rotor is substantially identical to said first rotor and disposed with its radial bladed end adjacent the radial bladed end of said first rotor.

2. A flowmeter as claimed in claim 1 wherein said first rotor is of the axial inflow-type and said second rotor is of the axial outflow-type 3. A flowmeter as claimed in claim 1 wherein said first rotor is of the radial inflow type and said second rotor is of the radial outflow type.

4. A flowmeter as claimed in claim 1 wherein said helical portions produce axial flow and said radial portions produce radial flow.

5. A flowmeter as claimed in claim 1 comprising an annular member attached to and rotating with said first rotor and extending about and radially spaced from the periphery of said second rotor.

6. A flowmeter as claimed in claim 1 wherein said torsional means is a linear torsion spring.

7. A fluid-driven mass flowmeter comprising:
    a. a first rotor having a helical bladed portion and a radial bladed portion for imparting an angular momentum to the fluid stream to be measured;
    b. a second rotor having a helical bladed portion and a radial bladed portion and positioned closely adjacent said first rotor with the radial bladed portions opposite each other for removing said angular momentum from the fluid stream;
    c. torsional means connected between said first and second rotors by which said second rotor drives said first rotor, said torsional means being deflected by the reactive torque produced on said first rotor by the fluid stream; and d. means for determining the effect of said reactive torque on said torsional means to measure the mass flow of the fluid stream.

8. A flowmeter as claimed in claim 7 wherein said radial bladed portions are of the axial flow type.

9. A flowmeter as claimed in claim 7 wherein said radial bladed portions are of the radial flow type.

10. A flowmeter as claimed in claim 7 comprising an annular member attached to and rotating with said second rotor and extending about and radially spaced from the periphery of said first rotor.

11. A flowmeter as claimed in claim 7 wherein the blades in said radial bladed portions are coplanar with the axis of rotation.

12. A flowmeter as claimed in claim 7 wherein said first and second rotors are substantially identical.